(12) United States Patent
Wei et al.

(10) Patent No.: US 7,831,564 B1
(45) Date of Patent: Nov. 9, 2010

(54) METHOD AND SYSTEM OF GENERATING A POINT-IN-TIME IMAGE OF AT LEAST A PORTION OF A DATABASE

(75) Inventors: Gaohong Wei, Mountain View, CA (US); HanCheng Hsiung, Union City, CA (US); Qiang Li, Foster City, CA (US)

(73) Assignee: Symantec Operating Corporation, Mountain View, CA (US)

( * ) Notice: Subject to any disclaimer, the term of this patent is extended or adjusted under 35 U.S.C. 154(b) by 511 days.

(21) Appl. No.: 10/737,281

(22) Filed: Dec. 16, 2003

(51) Int. Cl.
*G06F 7/00* (2006.01)
*G06F 17/00* (2006.01)
(52) U.S. Cl. .................. 707/649; 707/640
(58) Field of Classification Search .......... 707/200
See application file for complete search history.

(56) References Cited

U.S. PATENT DOCUMENTS

| | | | | |
|---|---|---|---|---|
| 5,905,990 | A * | 5/1999 | Inglett | 707/200 |
| 5,956,731 | A * | 9/1999 | Bamford et al. | 707/201 |
| 6,078,932 | A * | 6/2000 | Haye et al. | 707/204 |
| 6,473,775 | B1 * | 10/2002 | Kusters et al. | 707/200 |
| 6,571,245 | B2 * | 5/2003 | Huang et al. | 707/10 |
| 6,799,258 | B1 * | 9/2004 | Linde | 711/162 |
| 6,938,042 | B2 * | 8/2005 | Aboulhosn et al. | 707/10 |
| 7,133,884 | B1 * | 11/2006 | Murley et al. | 707/202 |
| 7,373,364 | B1 * | 5/2008 | Chapman | 707/204 |
| 7,509,248 | B2 * | 3/2009 | Fernandez | 703/27 |
| 2003/0093443 | A1 * | 5/2003 | Huxoll | 707/204 |
| 2003/0177135 | A1 * | 9/2003 | Lechowicz et al. | 707/100 |
| 2003/0220935 | A1 * | 11/2003 | Vivian et al. | 707/102 |
| 2003/0229651 | A1 * | 12/2003 | Mizuno et al. | 707/200 |
| 2004/0010487 | A1 * | 1/2004 | Prahlad et al. | 707/1 |
| 2004/0260726 | A1 * | 12/2004 | Hrle et al. | 707/104.1 |
| 2005/0021487 | A1 * | 1/2005 | Verma et al. | 707/1 |
| 2005/0027748 | A1 * | 2/2005 | Kisley | 707/200 |
| 2005/0071379 | A1 * | 3/2005 | Kekre et al. | 707/200 |
| 2005/0108302 | A1 * | 5/2005 | Rand et al. | 707/204 |

OTHER PUBLICATIONS

Veritas. "Veritas Flashsnap Point-In-Time Copy Solution 1.0: Administrator's Guide". Veritas. Nov. 2001.*
Veritas. "Veritas FlashSnap Point-In-Time Copy Solutions 1.0 Adminstrator's Guide". Nov. 2001. Veritas. pp. 1-72.*

* cited by examiner

*Primary Examiner*—John R. Cottingham
*Assistant Examiner*—Michael Pham
(74) *Attorney, Agent, or Firm*—Campbell Stephenson LLP (57) ABSTRACT

A method and system of generating a point-in-time image of at least a portion of a database is disclosed. According to one embodiment, a method is provided wherein a plurality of components of a database are discovered, a component of the plurality of components is selected, a data management resource of a plurality of data management resources is selected using an attribute of the component, and a point-in-time image of the component is generated using the data management resource.

32 Claims, 7 Drawing Sheets

METHOD AND SYSTEM OF GENERATING A POINT-IN-TIME IMAGE OF AT LEAST A PORTION OF A DATABASE

BACKGROUND

1. Technical Field

The present invention relates to data storage and retrieval generally and more particularly to a method and system of generating a point-in-time image of at least a portion of a database.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data. In order to avoid unnecessary downtime and data loss to the greatest degree possible, conventional data processing systems frequently use data replication, backup, and/or restoration to generate and utilize point-in-time (PIT) images of data. An "image" within the present description may include either an exact duplicate or replica of an element or alternatively, sufficient data related to an element (e.g., an exact duplicate of one or more sub-elements of an element) such that the element may be reconstructed.

The process of creating a PIT image of data may be initiated concurrently with or immediately following the generation or receipt of a request for such an image or alternatively may be initiated prior to the generation or receipt of such a request, such as where a storage element (e.g., disk group, disk, volume, plex, or the like) storing the data is "mirrored" using a mirror storage element which is subsequently separated or "broken off" at the point in time at which a PIT image is desired. Where the process of creating a PIT image is initiated concurrently with or following the generation or receipt of a request for such an image, subsequently occurring write operations or "updates" to the data may be queued before being applied to the data or the principle of copy-on-write (COW) may be used to preserve the state of the data prior the PIT image request.

The creation of a point-in-time image of part or all of a database presents a number of unique complications. Where a database or portion thereof is large in size, it is desirable to perform an associated PIT image creation operation (e.g., a backup copy operation) quickly to prevent the amount of required additional storage (e.g., for queued updates or COW data) or the amount of time where updates to the database or database portion are prohibited from growing too large. Where the structure (e.g., the components and their physical or logical relationship to one another) of a database is unknown, for example where data regarding such structure is proprietary, the creation of a PIT image has traditionally been performed using specialized utilities provided by the database management system (DBMS) provider or by applying a single data management resource type to all portions of a database.

Figure 1:
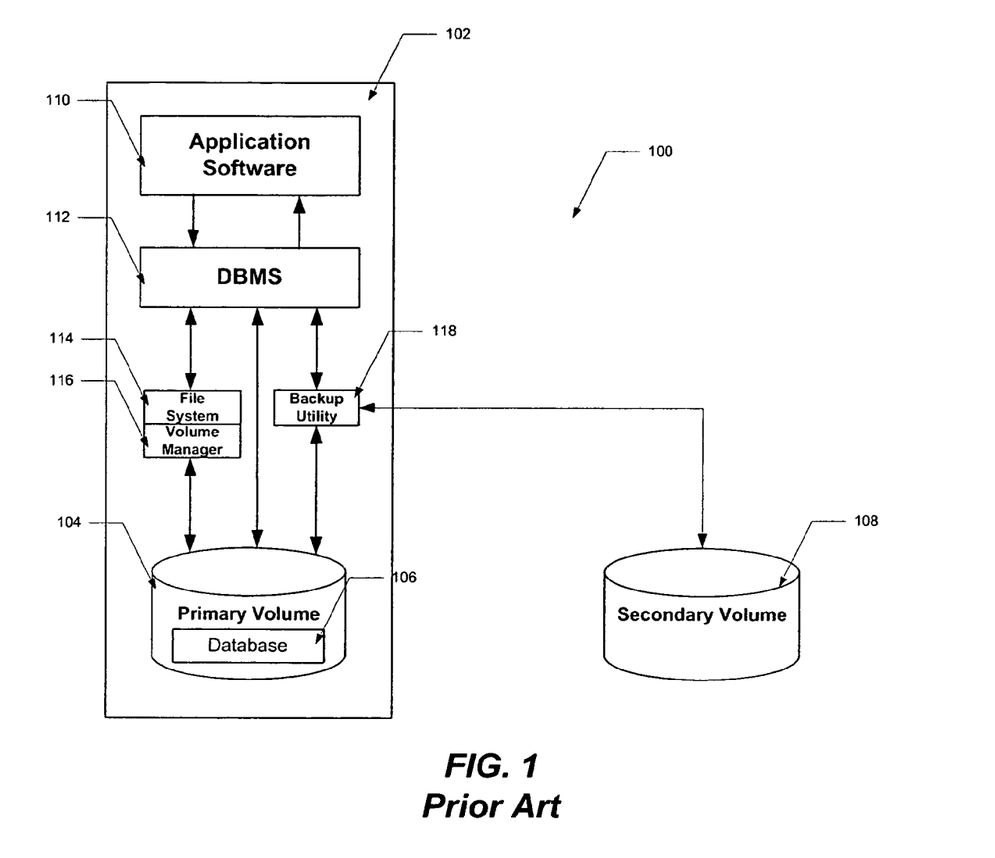
FIG. 1 illustrates a logical block diagram of a data processing system including a backup utility for generating a point-in-time image of at least a portion of a database according to the prior art.

FIG. 1 illustrates a block diagram of a data processing system including a backup utility for generating a point-in-time image of at least a portion of a database according to the prior art. Although backup and restoration may be thought of as separate processes, within the context of the present description the term "backup" can be considered to include both back up and restoration. Data processing system 100 includes a first node 102 including a primary volume 104 used to store a database 106 and a secondary volume 108 coupled to the first node 102. First node 102 of the embodiment of FIG. 1 further includes application software 110 (e.g., a database application) coupled to a database management system (DBMS) 112 which is in turn coupled to primary volume 104. DBMS 112 of the illustrated prior art embodiment may be coupled to primary volume 104 directly, using a file system 114 and/or volume manager 116, or using a backup utility 118 as described further herein. Backup utility 118 may be implemented as an independent element as illustrated in FIG. 1, or may be incorporated into one or more other elements (e.g., DBMS 112) of data processing system 100.

Using backup utility 118, a user may create a logical backup copy of database 106 or a portion thereof (e.g., a table space or partition) on secondary volume 108. Backup utility 118 receives a user-specified logical name (e.g., the logical name of the database to be backed up) and thereafter performs all operations necessary to generate the requested backup. Because only logical names are specified (e.g., a database name, table space name, or partition number), a user implementing backup utility 118 is not required to have any knowledge of the physical components of a database. For the same reason however, backup utility 118 may not be integrated with any other utilities or data management resources which require knowledge of such components and consequently may not take advantage of any newly developed PIT image creation techniques.

Figure 2:
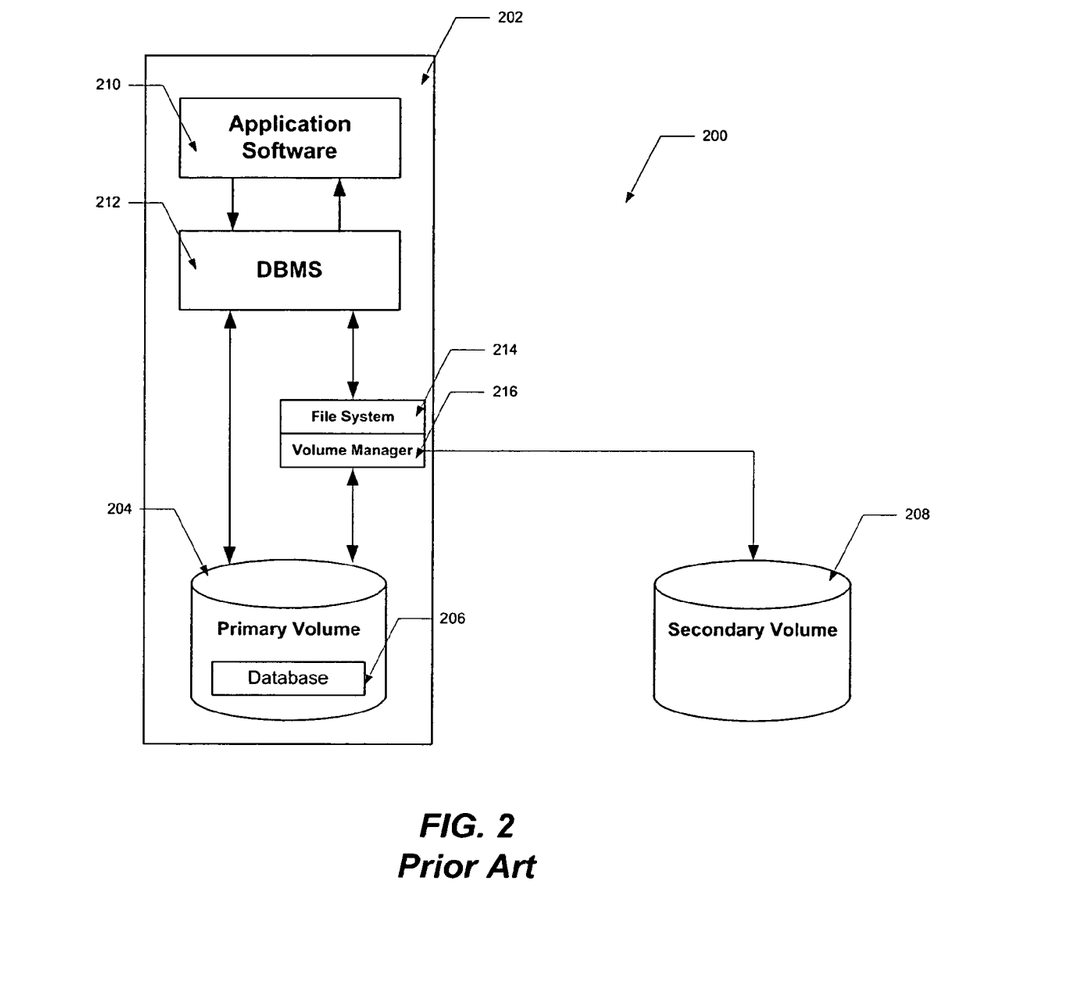
FIG. 2 illustrates a logical block diagram of a data processing system for generating a point-in-time image of at least a portion of a database using a split mirror according to the prior art.

FIG. 2 illustrates a block diagram of a data processing system for generating a point-in-time image of at least a portion of a database using a split mirror according to the prior art. Data processing system 200 includes a first node 202 including a primary volume 204 used to store a database 206 and a secondary volume 208 coupled to the first node 202. First node 202 of the embodiment of FIG. 1 further includes application software 210 (e.g., a database application) coupled to a database management system (DBMS) 212 which is in turn coupled to primary volume 204. DBMS 112 of the illustrated prior art embodiment may be coupled to primary volume 204 directly and/or using a file system 214 and/or volume manager 216 as described further herein.

A "split mirror" is an identical and independent copy of one or more disk volumes that can be attached to the same or different node as the mirrored disk volume(s). A split mirror is created by first "mirroring" or duplicating all write operations or "updates" performed on a primary volume to a secondary volume (e.g., secondary volume 208). While split mirror creation in the illustrated system of FIG. 2 is performed by volume manager 216, mirroring and/or split mirror creation may be performed in hardware or software by any of a variety of data processing system elements (e.g., application software 210, DBMS 212, file system 214, or the like). A split mirror is generated by merely ceasing to mirror write operations to a particular secondary volume, thus creating a PIT image of one or more entire volumes.

While database backup operations using split mirrors may be integrated with other data management utilities, such integration is limited because each split mirror must necessarily be generated at the volume level. Volume-level backup requires that a copy of an entire volume is made even if only a small amount of data (e.g., one or more small files) is to be backed up. Consequently, available storage space may be wasted and the number of databases which may be backed up and/or the number of backup copies of a database which may be made may be limited.

SUMMARY OF THE INVENTION

Disclosed is a method and system of generating a point-in-time image of at least a portion of a database. Embodiments of the present invention may be used to enable the use of optimal data management resources for each component of a database when a point-in-time image of at least a portion of the database is generated. According to one embodiment, the structure of a database is determined and used to discover components of the database. One or more attributes of a component of the database and/or a user-defined policy are then used to select a data management resource which is used to store the component.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 3:
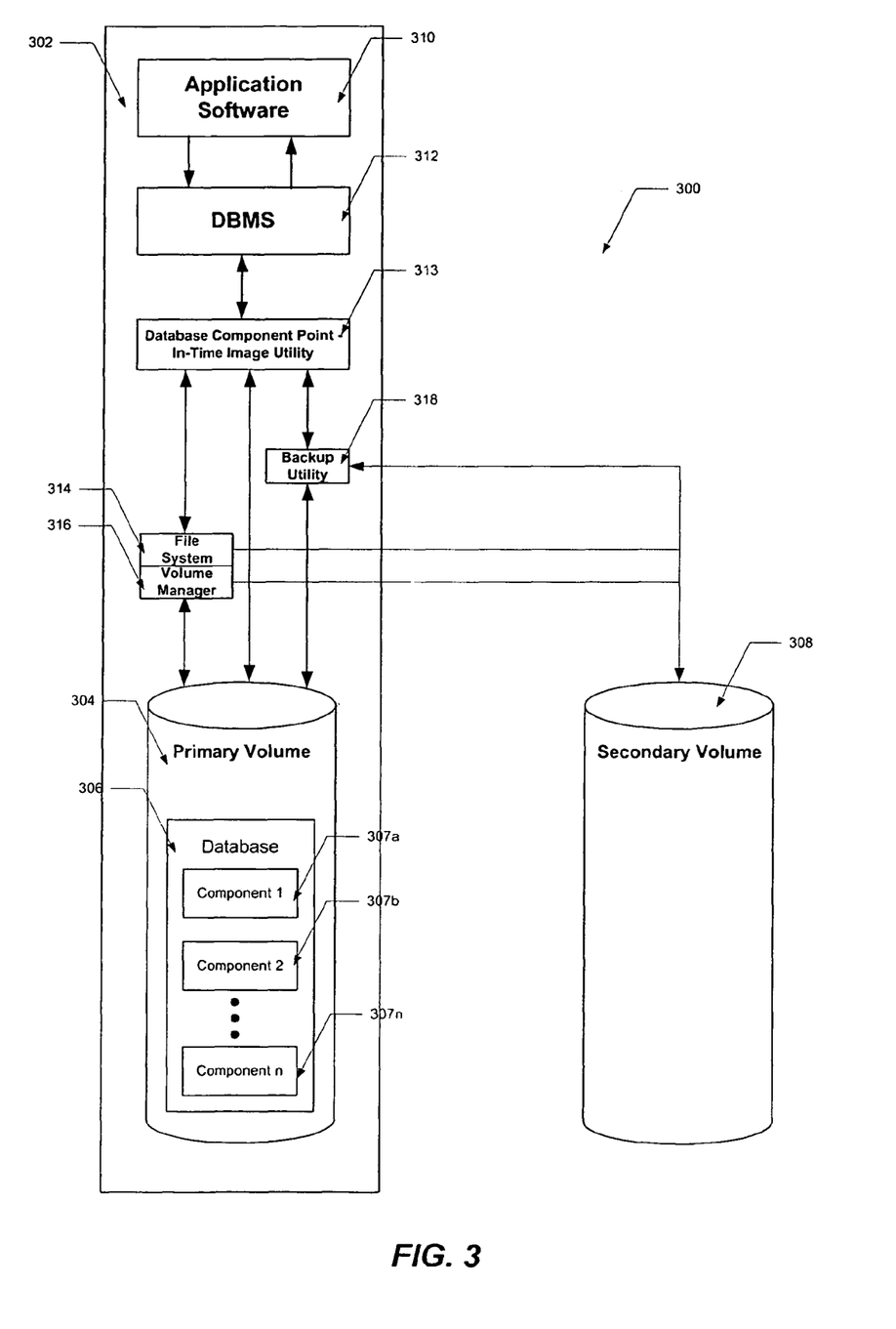
FIG. 3 illustrates a logical block diagram of a data processing system for generating a point-in-time image of at least a portion of a database according to an embodiment of the present invention.

FIG. 3 illustrates a logical block diagram of a data processing system for generating a point-in-time image of at least a portion of a database according to an embodiment of the present invention. Data processing system 300 includes a first node 302 including a primary volume 304 used to store a database 306 and a secondary volume 308 communicatively coupled to the first node 302. While secondary volume 308 has been illustrated within the embodiment of FIG. 3 as separate and distinct from first node 302, in alternative embodiments of the present invention secondary volume 308 may be implemented as a logical rather than a physical volume and consequently first node 302 may include secondary volume 308. In one such alternative embodiment for example, a point-in-time image of one or more components of a database is created using a file system checkpoint creation process data management resource. In the described embodiment, secondary volume 308 is actually free storage of a file system within primary volume 304. First node 302 of the embodiment of FIG. 3 further includes application software 310 (e.g., a database application) coupled to a database management system (DBMS) 312 which is coupled through database component point-in-time image utility 313 to primary volume 304.

Database component point-in-time image utility 313 of the illustrated embodiment may be coupled to primary volume 304 directly, using a file system 314 and/or volume manager 316 (e.g., VERITAS Volume Manager, provided by VERITAS Software Corporation of Mountain View, Calif.), or using a backup utility 318 as shown. According to one embodiment of the present invention, database component point-in-time image utility 313 is used to discover a plurality of components 307a-307n within database 304, select a component of the plurality of components, select a data management resource of a plurality of data management resources using an attribute of the selected component, and generate a point-in-time image of the selected component using the selected data management resource. In the described embodiment, components 307a-307n are discovered by first determining the structure of database 306 as described herein and using the determined structure to identify or locate components 307a-307n (e.g., by performing a search operation using an attribute such as a file extension of a component file or by using an directory or subdirectory identified when the database structure is determined). According to one embodiment of the present invention, the described PIT component image is used to generate a PIT image of database 306 within secondary volume 308.

Figure 4:
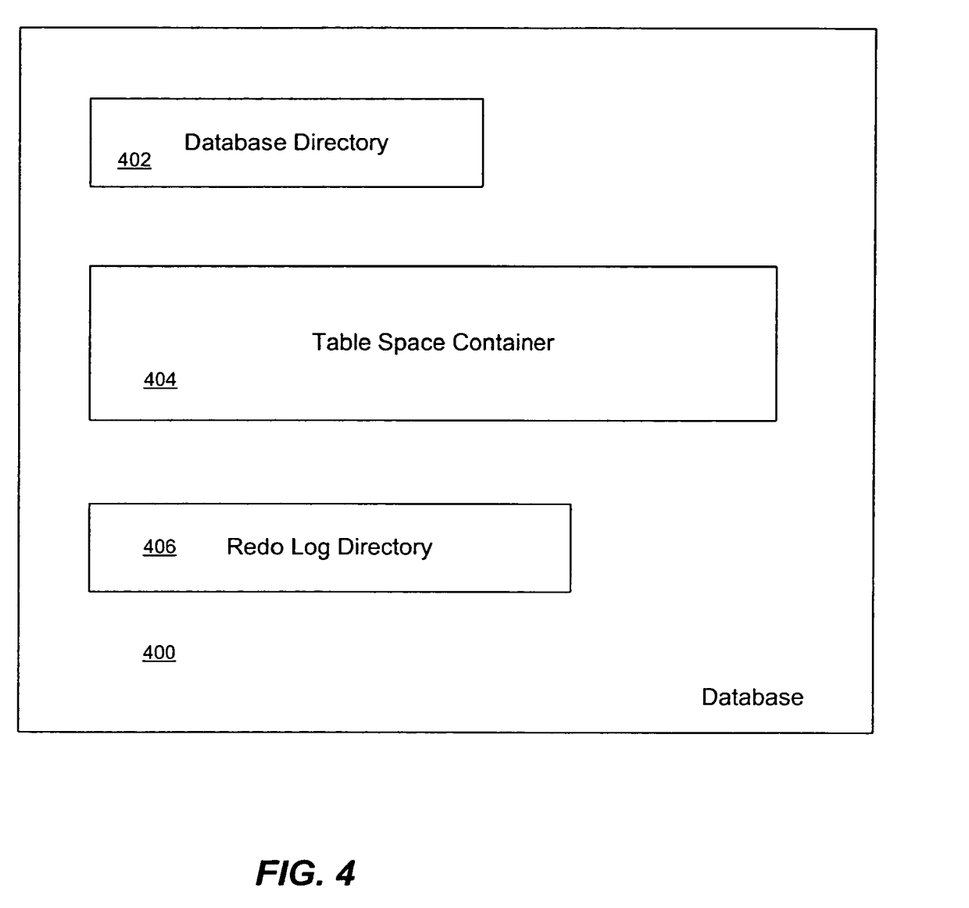
FIG. 4 illustrates a logical block diagram of a database including a plurality of components useable with one or more embodiments of the present invention.

FIG. 4 illustrates a logical block diagram of a database including a plurality of components useable with one or more embodiments of the present invention. Database 400 of the illustrated embodiment includes a database directory 402, a table space container 404, and redo log directory 406. According to one embodiment of the present invention, database 400 comprises a DB2™ EE (Enterprise Edition) database provided by International Business Machines (IBM) Corporation of Armonk, N.Y.

Database directory 402 is a directory, specified by a database administrator (DBA) upon the creation of the database which includes data relevant to database operation and consequently the creation of a PIT image of one or more components of a database. According to one embodiment of the present invention, the described data is stored within a subdirectory of database directory having the following hierarchical form:

database_directory/<instance_name>/NODE000x/
    SQL000x

Where database_directory specifies database directory 402, <instance_name> differentiates database instances (e.g., DB2 database instances) where multiple instance can share the same database directory, NODE000x differentiates partitions in a partitioned database environment where "x" is a number or other identifier, and SQL0000x specifies the subdirectory for a specific database where "x" is a number or other identifier (e.g., "SQL00001" for the first database created, with subsequently created databases receiving higher numbers).

In the described embodiment, table space container 404 may be system managed (SMS) or database managed (DMS). For an SMS table space, table space container 404 includes a file directory with all files within this directory belonging to the table space and consequently to the database. According to one embodiment, the file names of all files within the SMS table space directory begin with "SQL" and end with one of a group of file extensions (e.g., .inx, .bmp, .lf, .lb, .lba, .dtr, .lfr, .rlb, and .rba). When the described SMS table space includes no data, a tag file, "SQLTAG.NAM" is inserted into subdirectories of the table space directory such that the subdirectories are not used by subsequent table space creation operations. For a DMS table space by contrast, table space container 404 may include a predefined file or one or more raw devices.

Redo log directory 406, includes one or more redo logs for an associated database. A redo log is a file or set of files used to record all changes made to a database. According to one embodiment of the present invention, redo log directory 406 is specified using configuration data stored within database directory 402 and the name of each log file within redo log directory 406 is of the form S*.LOG, where "*" may include one or more wildcard characters. The described configuration data further specifies the number of primary log files, the number of secondary log files, and the number of pages in each log file. According to one embodiment of the present invention, when a PIT image of a database is generated, data is stored relating the redo log directory location and the first and last active log number at the time the PIT is generated but a PIT image of each active log is not created.

Figure 5:
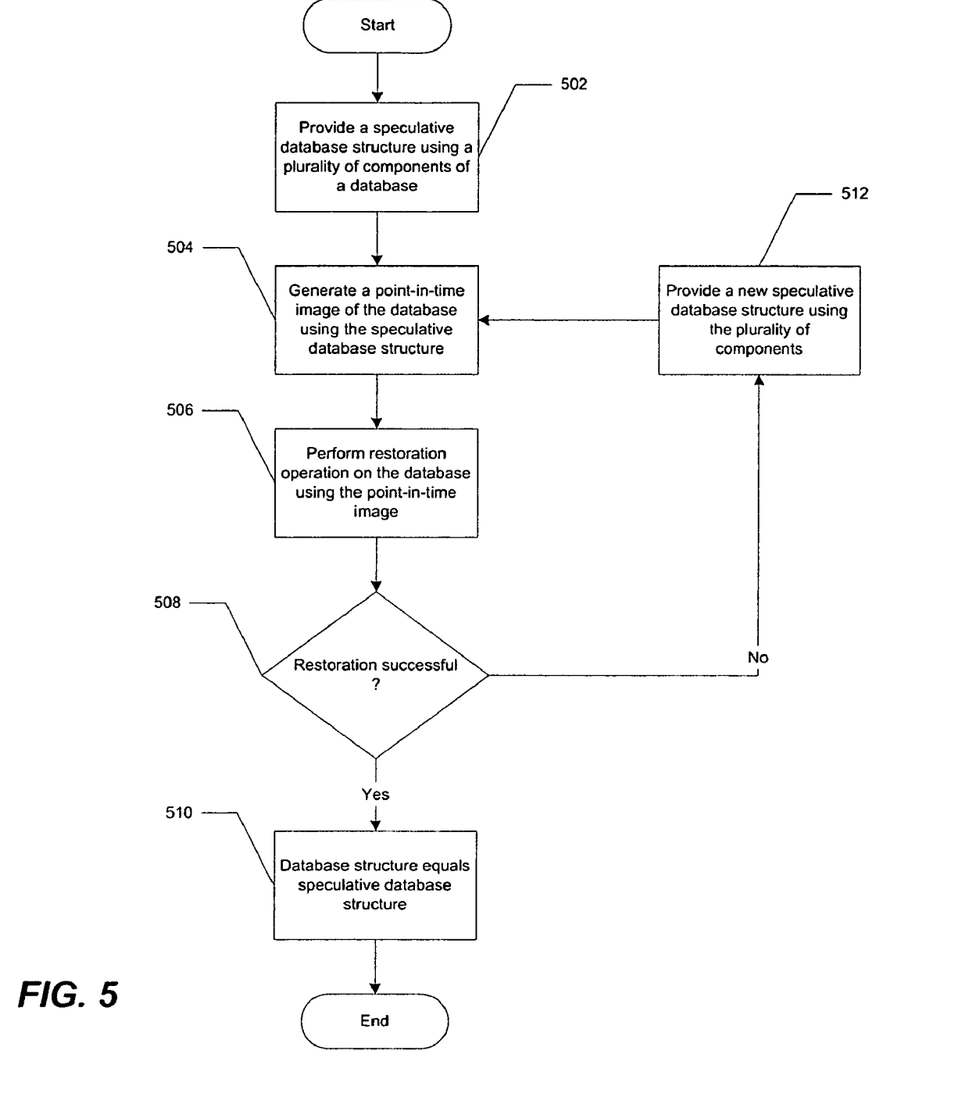
FIG. 5 illustrates a process flow diagram of a process for determining a database structure according to an embodiment of the present invention.

FIG. 5 illustrates a process flow diagram of a process for determining a database structure according to an embodiment of the present invention. According to one embodiment of the present invention, the illustrated process of FIG. 5 may be used to determine the structure of a database such as database 400 of FIG. 4. In the illustrated embodiment, the depicted process is applied to a database for which the structure is not previously known and the resulting structure is used to discover one or more components of the database for which a PIT image will be generated. The described database structure may be unknown due any of a variety of factors, e.g., where data regarding such structure has been retained by the database provider and not publicly disclosed, or where such data, although publicly available, has not been provided to the data processing system in which a PIT image of at least a portion of a database for some reason.

In the process embodiment illustrated in FIG. 5, a speculative database structure is initially provided using a plurality of components of a database (process block 502) for use in determining the database's actual structure (i.e., the components included within the database as well as their location and/or arrangement). The described speculative database structure may be provided by assembling or associating a number of random database components or component-types or by selecting one of a number of predefined database structures and may utilize any available data other than data specifically identifying or defining the structure of the database. According to one embodiment for example, an attempt is made to associate each of the plurality of components of the database with a unique component or component-type element of a speculative database structure to determine whether the number of database components and speculative database structure elements correspond.

Once the speculative database structure has been provided, a PIT of the database is generated based on the speculative database structure being considered (process block 504). Thereafter, a restoration operation is performed on the database using the generated PIT image (process block 506) and a determination is made whether or not the attempted database restoration was successful (process block 508). According to one embodiment of the present invention, the success or failure of the described restoration operation is determined by determining whether an error is indicated in response the described restoration operation or a subsequent access of the restored database. In an alternative embodiment of the present invention, the success or failure of the described restoration operation is determined by storing a copy of a portion of the database prior to generating the described PIT copy, accessing that portion of the database following the restoration operation, and comparing the accessed portion of the restored database with the previously stored copy.

In response to a determination that the database was successfully restored, the speculative database structure being considered is identified as the actual structure of the database (process block 510). Each time an attempted restoration is determined to have failed however, a new speculative database structure is provided (process block 512) and used to generate another PIT image of the database until the database's structure is determined. Once determined, data relating to the structure of the database may be used to generate a PIT image of one or more components of the database (e.g., database directory 402, table space container 404, and/or redo log directory 406 illustrated in FIG. 4) and/or the database as a whole using optimal data management resources. While in the embodiment of FIG. 5 a theoretical approach to determining the structure of a database has been illustrated, alternative approaches are contemplated by embodiments of the present invention. According to one embodiment, an experimental approach is implemented in which modifications are made to a database (e.g., the addition or removal of data, records, or the like) and changes in associated database component monitored to determine the structure of the of database.

Figure 6:
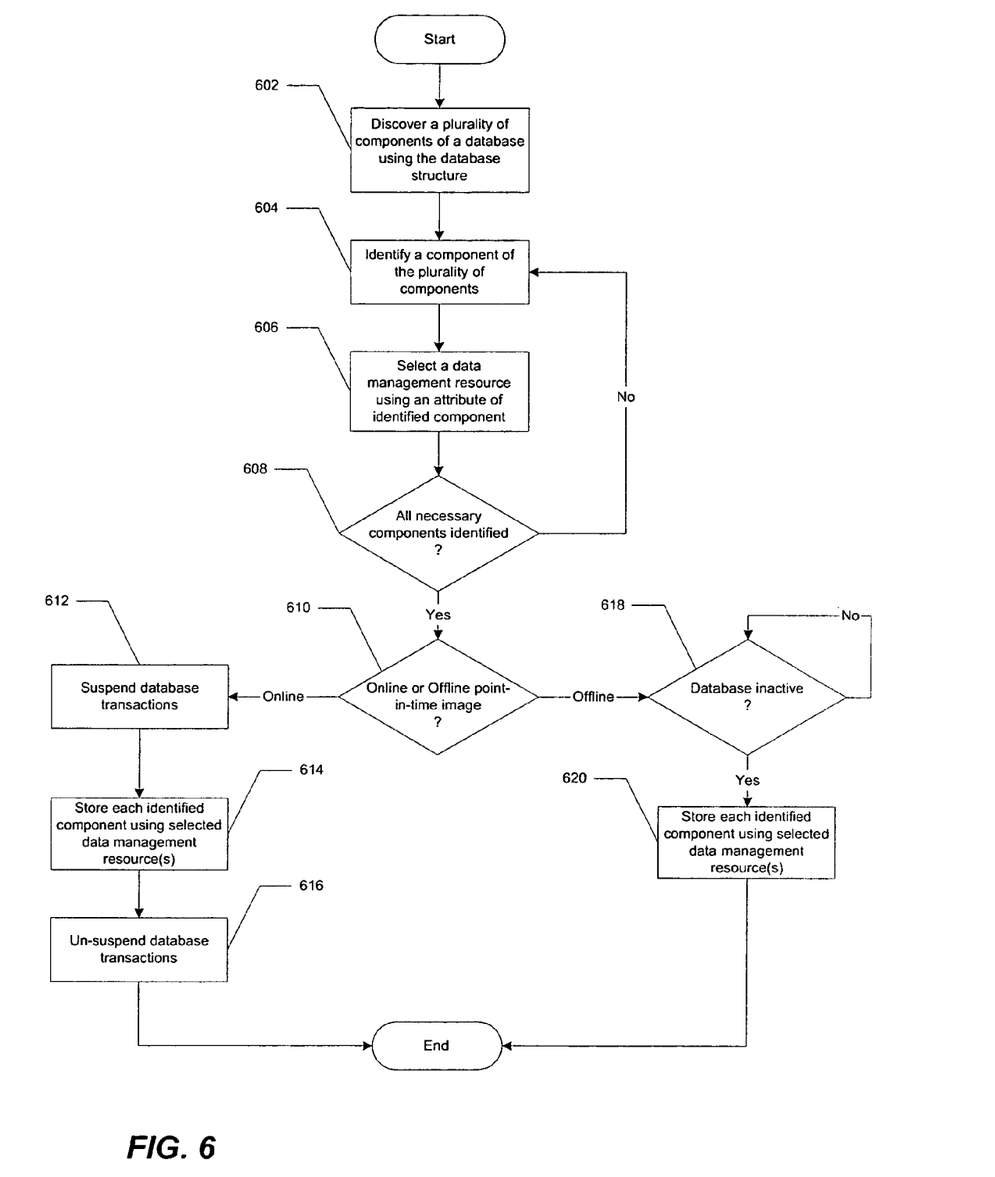
FIG. 6 illustrates a process flow diagram of a process for generating a point-in-time image of at least a portion of a database according to an embodiment of the present invention.

FIG. 6 illustrates a process flow diagram of a process for generating a point-in-time image of at least a portion of a database according to an embodiment of the present invention. In the illustrated process embodiment, a plurality of components of a database are discovered using the database structure (process block 602) determined, for example, as described with respect to FIG. 5. A component of the plurality of components is then identified (process block 604) for inclusion within a PIT image (e.g., a PIT image of the component, a group of components including the component, or the database as a whole). Thereafter, a data management resource is selected using one or more attributes of the identified component (process block 606). Any attribute (e.g., component size, type, structure, storage location, or the like) of the identified database component may be used to select the described data management resource.

An attribute may include, for example, the size of a file or directory, a file system type, table space usage (for DMS table spaces), whether the component is created on a volume, whether the volume is mirrored, or the like. In an alternative embodiment of the present invention a user-defined policy may be used in addition to or in place of a component attribute to select a data management resource. A user-defined policy may include data which specifies the desired order in which data management resources are to be used, a threshold component size for use of an operating system copy command, space to be used to store table space components (e.g., for a DMS table space), and whether or not a point-in-image of a specific table space (e.g., a temporary table space) is to be generated, or the like.

Within the context of the present description a data management resource may include any resource used to manage the storage, transfer, and duplication of data. According to one embodiment of the present invention, the described data management resource is a process which may be used in the creation of a PIT image such as a backup utility process, a replication process, a mirroring process, a file system checkpoint (e.g., a VERITAS File System Storage Checkpoint) creation process, a snapshot creation process, a file system or operating system-level "copy" command, or the like, or any combination thereof selected from a group of such processes available within a data processing system having access to the database. In other embodiments however, a data management resource may include a logical or physical data storage element such as a data volume (e.g., a VERITAS Volume Manager volume, or IBM Logical Volume Manager (LVM) volume), transmission media, or the like.

A determination is then made whether or not all necessary components have been identified (process block 608) for example, where a PIT image is to be generated of a group of such components or of an entire database including a plurality of components. Until all necessary components are identified, another component is identified and a data management resource selected as previously described following the described determination. Once a determination is made that all necessary components have been identified, a determination is then made whether an online PIT image (e.g., an online snapshot) or an offline PIT image (e.g., an offline snapshot) is to be generated (process block 610).

When an online PIT image is to be created, operations which modify (i.e., which perform post and commit operations) a database are merely suspended for a brief period of time during PIT image creation such that there is no detectable lapse in database accessibility. When an offline PIT image is to be created by contrast, a database is rendered inaccessible prior to PIT image creation. Accordingly, for online PIT images, database transactions are suspended (process block 612), identified components are stored using corresponding selected data management resources (process block 614), and database transaction are the un-suspended (process block 616). While the term "store" has been used with respect to the embodiment depicted in FIG. 6, in some embodiments of the present invention actual component storage is not required. For example, where a file system storage checkpoint creation process or similar data management resource is implemented which uses the principle of "copy-on-write", a point-in-time image of an identified component may be created without copying any component data unless or until such component data is modified.

Although in the illustrated process embodiment all identified components are stored at one time, database transaction may be suspended and un-suspended for each identified component individually or for sub-groups of components to reduce the amount of time for which database transactions are continuously suspended, for example, where the number of components to be stored is large. Similarly, for offline PIT images a determination is first made whether or not the database is inactive (process block 618). Once the database is determined to be inactive identified components are stored using corresponding selected data management resources (process block 620).

According to an embodiment of the present invention, PIT images of one or more components of a database may be used to restore or "recover" the database and/or to create a duplicate copy of, or "clone" the database. In the described embodiment, data specifying the original source location of database component as well as the data management resource (e.g., the PIT image creation process used) associated with the component are generated and/or stored whenever a PIT image of a database component is created. This data may then be used to restore one or more database components and/or the database as a whole to the point in time when PIT images of each component were created. When an "online" PIT image of a database is used to perform restoration additional operations may be required to return the database to a consistent state. In such an alternative embodiment of the present invention, a database is initially set into a "recovery" mode following restoration, and restored log file data (e.g., data from the first active log of the database) is used to return the database to a consistent state before the database is returned to an "operational" or "active" mode.

Figure 7:
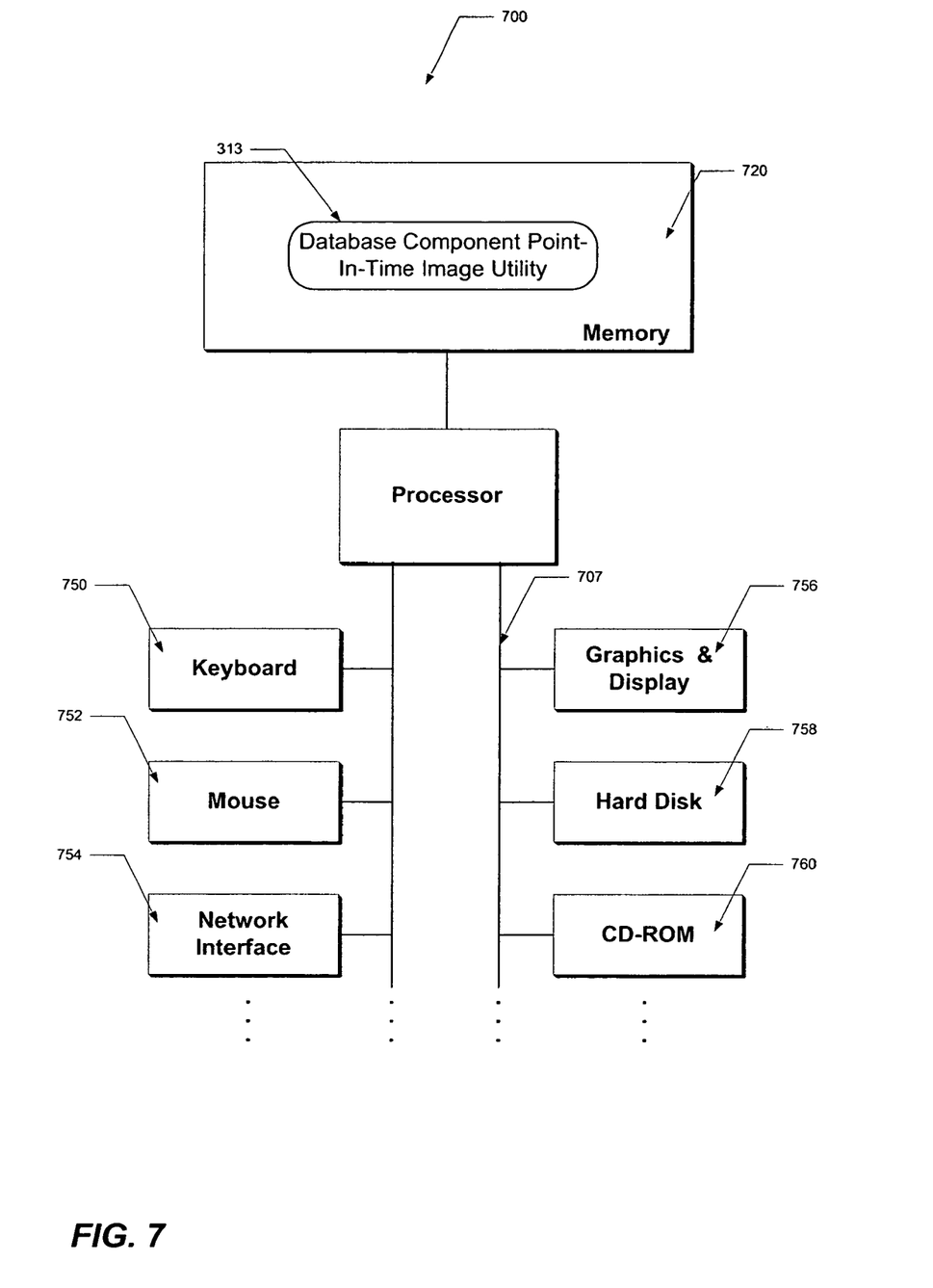
FIG. 7 illustrates a block diagram of a data processing system useable with one or more embodiments of the present invention.

FIG. 7 illustrates a block diagram of a data processing system useable with one or more embodiments of the present invention. Data processing system 700 can be used, for example, to implement one or more nodes of a larger data processing system as previously described with respect to FIG. 3. Data processing system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., database component point-in-time image utility 313. Memory 720 is also used for storing temporary variables or other intermediate data during the execution of instructions by the processor 710.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; DBMS languages such as various implementations of SQL, and scripting languages such as Shell, Perl and Tcl/Tk. Additionally, database component point-in-time image utility 313 can be provided to the data processing system via a variety of machine-readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Data processing system 700 of the illustrated also includes devices such as keyboard 750, and mouse 752, network interface 754, graphics & display 756, hard disk 758, and CD-ROM 760, all of which are coupled to processor 710 by communications bus 707. It will be apparent to those having ordinary skill in the art that data processing system 700 can also include numerous elements not shown in the figure, such as additional storage devices, communications devices, input devices, and output devices, as illustrated by the ellipsis shown. According to one alternative embodiment of the present invention, such an additional data processing system device comprises a fibre channel interface.

Although the systems, methods, apparatus and software of the present invention have been described using database management system and database examples, it will be understood by those having ordinary skill in the art that extension can be made to virtually any data producing/process application and the resulting data. Thus, the present application should not be thought of as being limited to use in the context of databases and database management systems.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the relevant arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future. Additionally, it should be understood that embodiments of the present invention are not limited to a particular type of data processing or computer system. Rather, embodiments of the present invention may be implemented in a wide variety of data processing systems (e.g., host computer systems, network switches, network appliances, and/or disk arrays).

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   determining a speculative structure of a database,
      wherein said determining said speculative structure of said database comprises selecting, by a computer, said speculative structure of said database from among a plurality of predefined database structures,
      said database comprises the a plurality of components,
      said database is stored on a storage volume,
      said speculative structure of said database comprises a speculative arrangement of database components,
         said speculative arrangement is intended to match an actual structure of said database, and
         said actual structure of said database is unknown when said determining said speculative structure of said database is performed;
   detecting whether said speculative structure of said database matches said actual structure of said database,
      wherein said detecting whether said speculative structure of said database matches said actual structure of said database comprises comparing restored data with original data,
         said restored data comprises data from a backup copy of said original data, and
         said backup copy was formed using said speculative structure of said database;
   identifying each of said plurality of components of said database using said speculative structure of said database;
   selecting a component of said plurality of components of said database;

selecting a data management resource of a plurality of data management resources using an attribute of said component of said plurality of components of said database; and generating a point-in-time image of said component of said plurality of components of said database using said selected data management resource of a plurality of data management resources.

2. The method of claim 1, further comprising:

performing one or more operations to determine if said speculative structure of said database is equivalent to an actual structure of said database.

3. The method of claim 1, wherein said selecting a component of said plurality of components of said database comprises:

selecting said component of said plurality of components of said database to include within a point-in-time image of said database.

4. The method of claim 1, wherein said selecting a component of said plurality of components of said database comprises:

selecting at least one of a database directory, a table space container, and a redo
log directory.

5. The method of claim 1, wherein said selecting a data management resource of a plurality of data management resources comprises: selecting said data management resource using said attribute of said component of said plurality of components of said database and a user-defined policy.

6. The method of claim 1, wherein said selecting a data management resource of a plurality of data management resources comprises:

selecting said data management resource using at least one of a size attribute, a type attribute, a structure attribute, and a location attribute.

7. The method of claim 6, wherein said selecting said data management resource of a plurality of data management resources further comprises:

defining a component size range; and selecting said data management resource in response to a determination that said size attribute is within said component size range.

8. The method of claim 1, wherein said selecting a data management resource of a plurality of data management resources comprises: selecting a point-in-time image creation process.

9. The method of claim 8, wherein said point-in-time image creation process comprises at least one of: a file-level point-in-time image creation process, a directory-level point-in-time image creation process, a file system-level point-in-time image creation process, a storage device-level point-in-time image creation process, a volume-level point-in-time image creation process, and a volume group-level point-in-time image creation process.

10. The method of claim 8, wherein said selecting a point-in-time image creation process comprises:

selecting at least one of: a snapshot creation process, a storage checkpoint creation process, and a file copy command, and a backup utility process.

11. The method of claim 2, further comprising:

restoring said database using said point-in-time image of said component.

12. The method of claim 11, wherein, said database is initially stored within a first storage region, and said restoring comprises, restoring said database to a second storage region.

13. An apparatus comprising:

means for determining a speculative structure of a database, wherein said means for determining said speculative structure of said database comprises means for selecting said speculative structure of said database from among a plurality of predefined database structures, said database comprises the a plurality of components, said speculative structure of said database comprises a speculative arrangement of database components, and said speculative arrangement is intended to match an actual structure of said database, said actual structure of said database is unknown when said determining said speculative structure of said database is performed;

means for detecting whether said speculative structure of said database matches said actual structure of said database, wherein said means for detecting whether said speculative structure of said database matches said actual structure of said database comprises comparing restored data with original data, said restored data comprises data from a backup copy of said original
data, and said backup copy was formed using said speculative structure of said
database;

means for identifying each of said plurality of components of said database using said speculative structure of said database;

means for associating a data management resource with a component of said plurality of components of said database;

means for generating a point-in-time image of said component of said plurality of components of said database using said associated data management resource; and a hardware storage means for storing said database.

14. The apparatus of claim 13, further comprising: means for performing one or more operations to determine if said speculative structure of said database is equivalent to an actual structure of said database.

15. The apparatus of claim 13, wherein said means for associating a data management resource with a component of said plurality of components of said database comprises: means for associating a point-in-time image creation process with said component
of said plurality of components.

16. The apparatus of claim 13, wherein said means for associating a data management resource with a component of said plurality of components of said database comprises:

means for associating said associating data management resource with said component of said plurality of components of said database using an attribute of said component.

17. The apparatus of claim 16, wherein said means for associating a data management resource with a component of said plurality of components of said database further comprises:

means for associating said associating data management resource with said component of said plurality of components of said database using a user-defined policy.

18. The apparatus of claim 16, wherein said means for associating said data management resource with said component of said plurality of components of said database using an attribute of said component comprises:
　means for associating said data management resource with said component of said plurality of components of said database using at least one of a size attribute, a type attribute, a structure attribute, and a location attribute.

19. The apparatus of claim 18, wherein said means for associating said data management resource with said component of said plurality of components of said database using an attribute of said component further comprises:
　means for defining a component size range; and
　means for associating said data management resource with said component of said plurality of components of said database in response to a determination that said size attribute is within said component size range.

20. The apparatus of claim 13, wherein said means for generating comprises:
　means for generating a point-in-time image of said database.

21. The apparatus of claim 13, further comprising: means for restoring said database using said point-in-time image of said component.

22. The apparatus of claim 21, wherein said database is initially stored within a first storage region, and said means for restoring comprises, means for restoring said database to a second storage region.

23. A program product comprising:
　a non-transitory machine-readable storage medium having a plurality of instructions executable by a machine embodied therein, wherein said plurality of instructions when executed cause said machine to:
　determine a speculative structure of a database,
　　wherein said speculative structure of said database is selected from among a plurality of predefined database structures,
　　said database comprises a plurality of components,
　　said speculative structure of said database comprises a speculative arrangement of database components,
　　　said speculative arrangement is intended to match an actual structure of said database,
　　　　said actual structure of said database is unknown when said determining a speculative structure of a database is performed, and
　　said database is stored on a storage volume;
　detect whether said speculative structure of said database matches said actual structure of said database,
　　wherein detecting comprises comparing restored data with original data,
　　　said restored data comprises data from a backup copy of said original data, and
　　　said backup copy was formed using said speculative structure of said database;
　identify each of said plurality of components of said database using said speculative structure of said database;
　select a component of said plurality of components of said database;
　select a data management resource of a plurality of data management resources using an attribute of said component of said plurality of components of said database; and
　generate a point-in-time image of said component of said plurality of components of said database using said selected data management resource of the plurality of data management resources.

24. The program product of claim 23, further comprising:
　performing one or more operations to determine if said speculative structure of said database is equivalent to an actual structure of said database.

25. The program product of claim 23, wherein selecting a component of said plurality of components of said database comprises:
　selecting said component of said plurality of components to include within a point-in-time image of said database.

26. The program product of claim 23, wherein selecting a data management resource of a plurality of data management resources comprises:
　selecting said data management resource using said attribute of said component and a user-defined policy.

27. The program product of claim 23, wherein selecting a data management resource of a plurality of data management resources comprises:
　selecting a point-in-time image creation process.

28. A system comprising:
　a first non-transitory computer-readable storage medium configured to store a database;
　a point-in-time image utility configured to,
　　access said a first storage element;
　　determine a speculative structure of said database,
　　　wherein said determining said speculative structure of said database comprises
　　　　selecting said speculative structure of said database from among a plurality of predefined database structures,
　　　said database comprises plurality of components,
　　　said speculative structure of said database comprises a speculative arrangement of database components, and
　　　　said speculative arrangement is intended to match an actual structure of said database,
　　　　　said actual structure of said database is unknown when said determining said speculative structure of said database is performed;
　　detect whether said speculative structure of said database matches said actual structure of said database
　　　wherein detecting whether said speculative structure of said database matches said actual structure of said database comprises comparing restored data with original data,
　　　said restored data comprises data from a backup copy of said original data; and
　　　said backup copy was formed using said speculative structure of said database;
　　identify each of said plurality of components of said database using said speculative structure of said database;
　　select a component of said plurality of components of said database;
　　select a data management resource of a plurality of data management resources using an attribute of said component of said plurality of components of said database; and
　　generate a point-in-time image of said component of said plurality of components of said database using said selected data management resource of a plurality of data management resources.

29. The system of claim 28, wherein said point-in-time image utility comprises:
　a memory to store said point-in-time image utility; and
　a processor coupled to said memory to execute said point-in-time image utility.

30. The system of claim 28, further comprising a first node, wherein said first node comprises said first storage element and said point-in-time image utility.

31. The system of clam 30, further comprising a second node communicatively coupled to said first node, wherein said second node comprises a second storage element to store said point-in-time image of said component.

32. The system of claim 28, wherein said point-in-time image utility configured to discover a plurality of components is further configured to: perform one or more operations to verify if said speculative structure of said database is equivalent to an actual structure of said database.

\* \* \* \* \*